US008723798B2

(12) United States Patent
Vernacchia

(10) Patent No.: US 8,723,798 B2
(45) Date of Patent: May 13, 2014

(54) SYSTEMS AND METHODS FOR OBTAINING USER COMMAND FROM GAZE DIRECTION

(76) Inventor: Matthew T. Vernacchia, Upper St. Clair, PA (US)

( * ) Notice: Subject to any disclaimer, the term of this patent is extended or adjusted under 35 U.S.C. 154(b) by 319 days.

(21) Appl. No.: 13/278,606

(22) Filed: Oct. 21, 2011

(65) Prior Publication Data

US 2013/0100025 A1  Apr. 25, 2013

(51) Int. Cl.
*G09G 5/00* (2006.01)
(52) U.S. Cl.
USPC ............................ 345/168; 351/210; 382/103
(58) Field of Classification Search
USPC ............ 345/168–172; 382/103; 351/209, 210
See application file for complete search history.

(56) References Cited

U.S. PATENT DOCUMENTS

2004/0174496 A1* 9/2004 Ji et al. .......................... 351/209
2009/0196460 A1* 8/2009 Jakobs et al. ................. 382/103

OTHER PUBLICATIONS

"Components and Prices of the Eyegaze Edge," Assistive Technology, LC Technologies, Inc., 2009, available at http://www.eyegaze.com/content/components-and-prices-eyegaze-edge.

"Development of Gaze Tracking Technology," ITU GazeGroup, Aug. 8, 2010, available at http://www.gazegroup.org/research.
DynaVox EyeMax Product Information Sheet, 2011, available at http://www.dynavoxtech.com/products/eyemax/.
"Facts You Should Know About ALS," ALS Association, 2007, available at http://www.alsa.org/als/facts.cfm.
Lazebnik, Svetlana, "Edge detection," COMP 776: Computer Vision, University of North Carolina, Jan. 29, 2008, available at http://www.cs.unc.edu/~lazebnik/research/spring08/lec06_edge.pdf.
Nesbat, Saied B., "A system for fast, fulltext entry for small electronic devices," Proc. 5th Int'l Conf. Multimodal Interfaces, pp. 4-11 (2003).
Rus, Daniela, "Cameras, Images, and Low-Level Robot Vision," Robotics: Science and Systems I, MIT Computer Science and Artificial Intellignece Laboratory, Feb. 16, 2011, available at http://courses.csail.mit.edu/6.141/spring2011/pub/lectures/Lec05-CameraVision.pdf.
"T9®: The Global Standard for Mobile Text Input," Nuance, Sep. 3, 2010, available at http://www.nuance.com/for-business/by-product/t9/index.htm.

* cited by examiner

*Primary Examiner* — Premal Patel
(74) *Attorney, Agent, or Firm* — Covington & Burling LLP; Gregory S. Discher; Andrea G. Reister

(57) ABSTRACT

In one embodiment of the present invention, a computer-implemented method for obtaining a command of a user includes capturing an image of the eyes of a user. The coordinates of a glint center point and the coordinates of an eye center point are calculated from the image. The gaze direction of the user is calculated from the coordinates of a glint center point and the coordinates of an eye center point to determine a corresponding command.

20 Claims, 14 Drawing Sheets

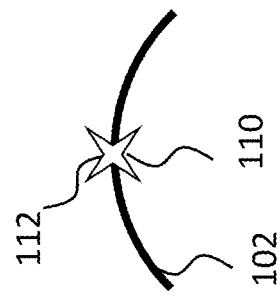
Fig. 1d
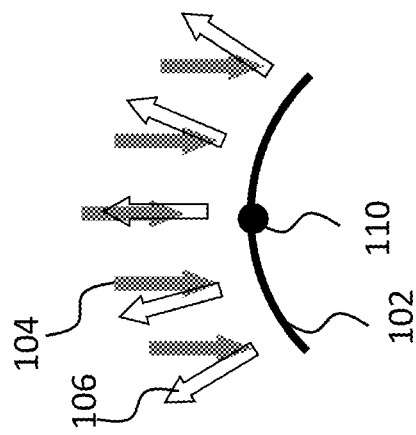
Fig. 1c
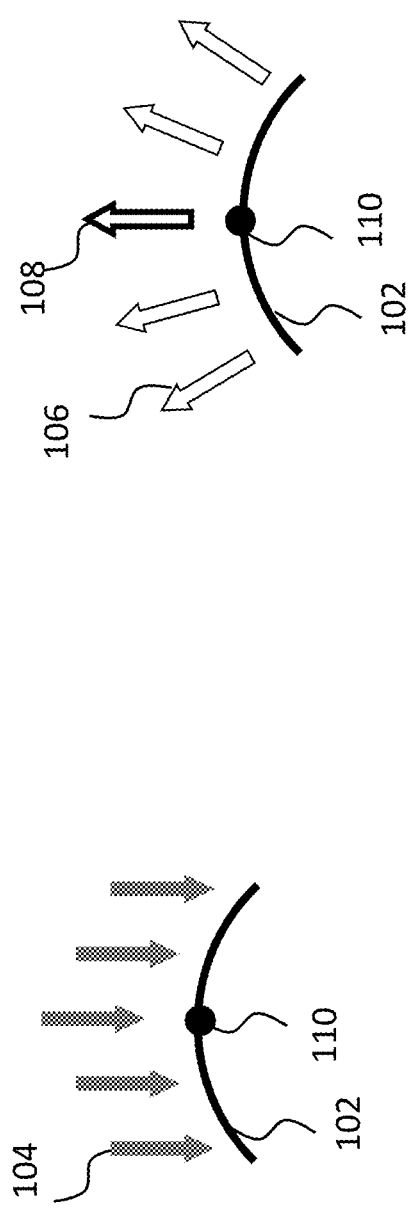
Fig. 1b
Fig. 1a

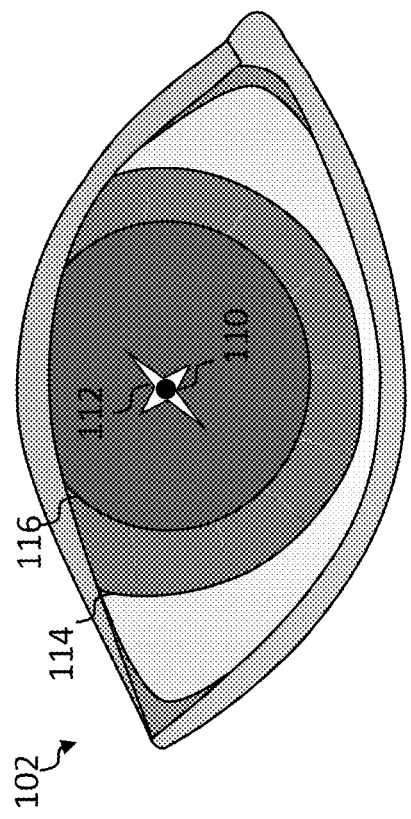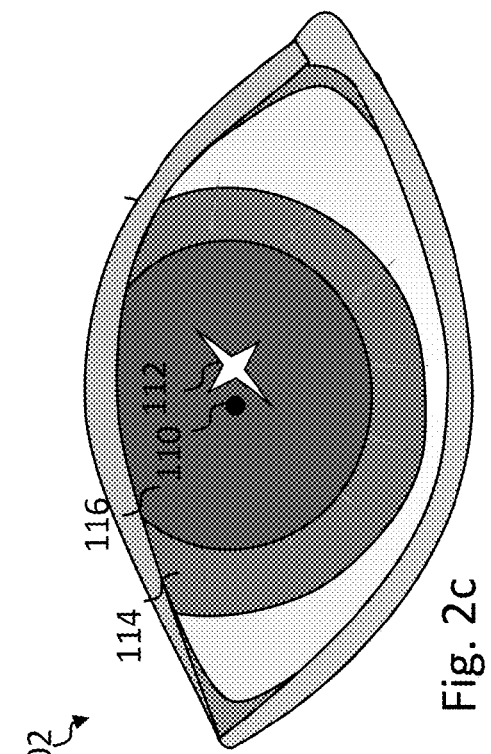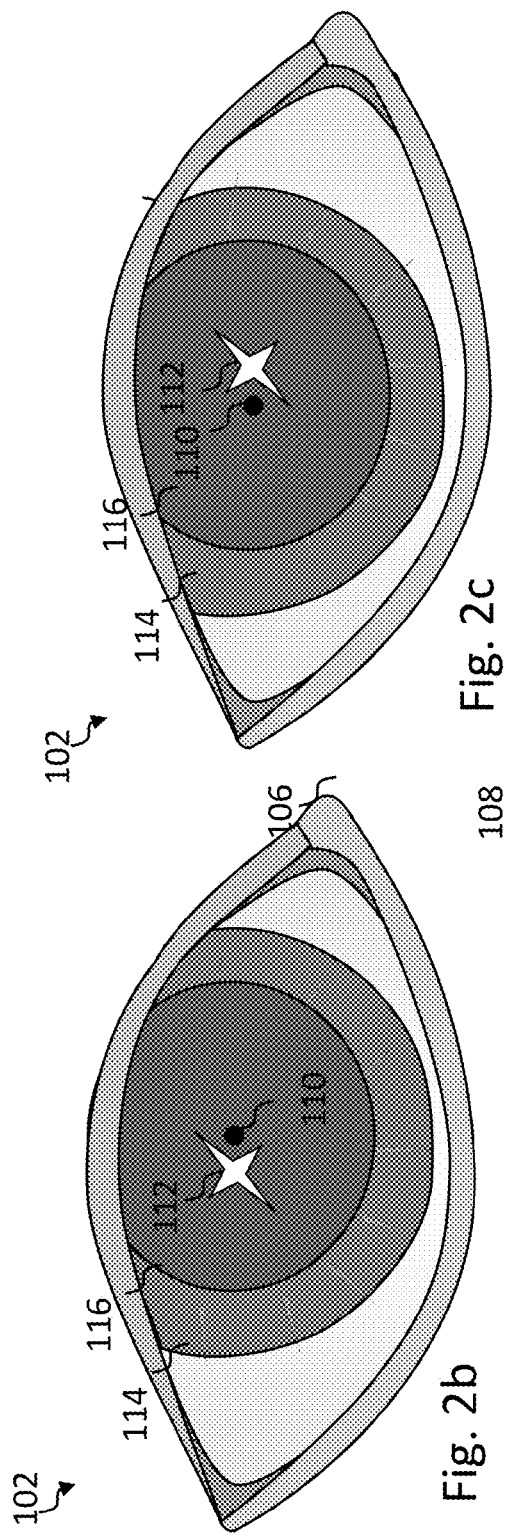

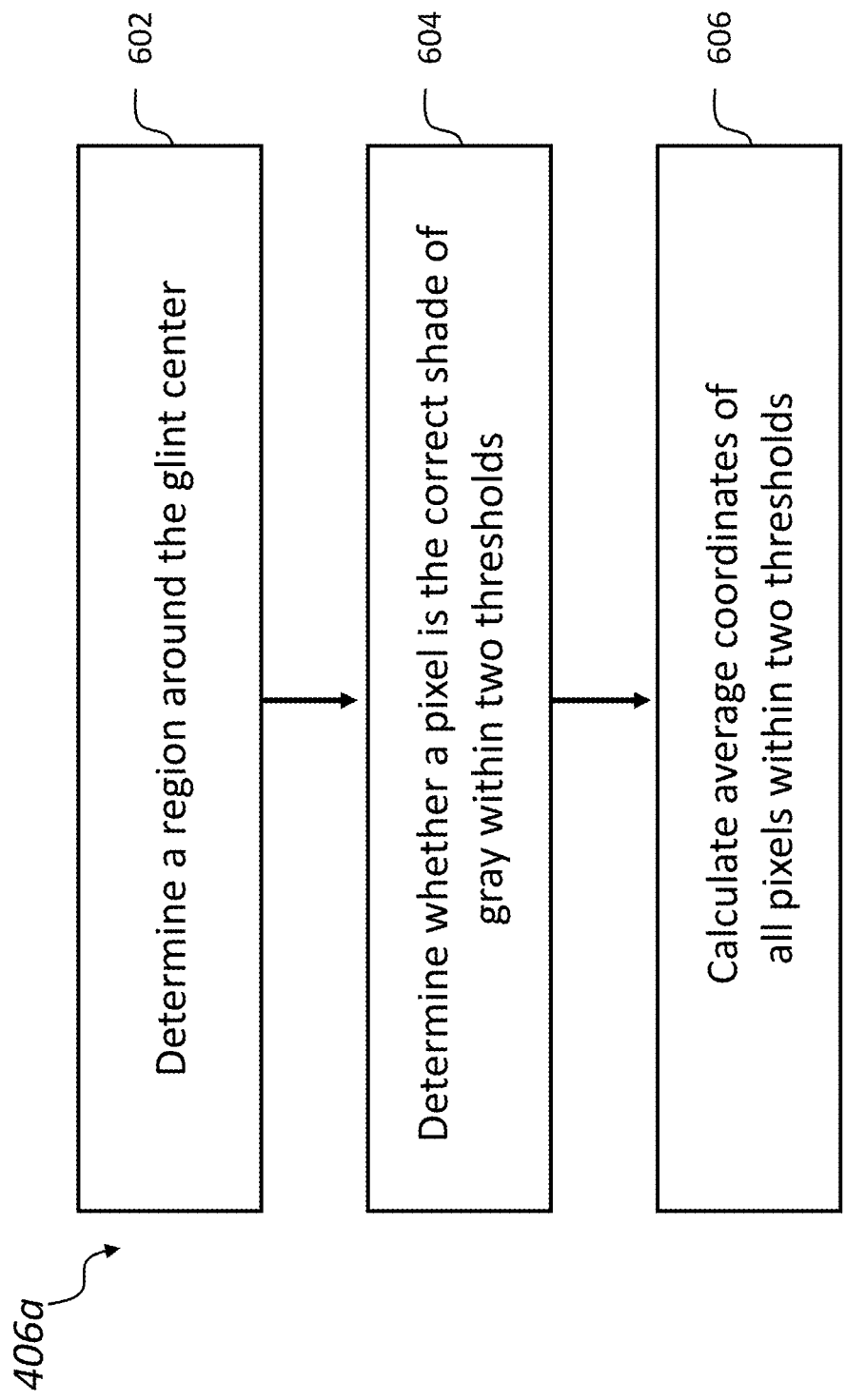

SYSTEMS AND METHODS FOR OBTAINING USER COMMAND FROM GAZE DIRECTION

FIELD OF EMBODIMENTS OF THE INVENTION

Embodiments of the present invention generally relate to facilitating communication between patients and medical personnel by providing a typing interface that can be controlled by a patient's gaze direction.

BACKGROUND OF EMBODIMENTS OF THE INVENTION

In the fast-paced environment of a hospital, particularly at an Intensive Care Unit (ICU), efficient communication between medical personnel and patients is essential. For doctors and nurses, knowing how a patient is feeling, what pre-existing conditions or allergies they have, the circumstances of their illness or accident, and other information may lead to accurate (or more accurate) diagnosis, faster treatments, and better outcomes. However, such communication is often inhibited by the medical conditions or devices associated with the patient's hospitalization. For these patients, an unconventional form of communication is needed to ensure the transfer of vital information from the patient to the medical personnel.

There are known systems that have been utilized in efforts to enable efficient communication between patients and medical personnel. Prior computerized solutions such as the Maestro and Vmax+ from DynaVox® enable patients capable of finger movement to type words and select commands from a touch screen. For patients with limited mobility, eye tracking is a preferred option. Systems such as DynaVox®'s EyeMax™ and LC Technology's Eyegaze Edge® provide a user interface that can be controlled by eye movements by tracking the location of a patient's eyes. By looking at different options on the screen, patients may select various words and commands. However, such systems are often prohibitively expensive, with most models typically costing between $7,000 and $10,000, making them difficult for hospitals to adopt and leaving a critical communication gap between medical personnel and patients.

To reduce cost, hospitals commonly use "pointing cards." Pointing cards typically have a word or a phrase such as "pain," "hot," "cold," and "stay with me," along with an icon representing the word or phrase. A nurse or a family member will hold up the card, and the patient will point at the icon representing the message they wish to express. This process, however, is tedious and time-consuming for both medical personnel and patients. Moreover, raising an arm to point can be difficult or impossible for immobile patients. In addition, the information obtained can be vague or may require further interpretation by medical personnel, which can lead to communication errors. Therefore, the entire process can be frustrating to medical personnel, and more significantly, to patients.

In order to make communication easier and quicker, a relatively low-cost computerized communication assistance system is needed. Most patients capable of conscious thought retain the ability to move their eyes, and eye movement requires less physical strength than other forms of gesturing. Aspects and embodiments of the present invention are directed to providing communication systems and methods that utilize a patient's eye movement. In one embodiment of the present invention, a computer system captures images of a patient's eyes and processes the images to classify the patient's gaze direction as one of several possible commands. The command is then used as an input for an interface that will enable the patient to express words or phrases.

Embodiments of the present invention provide a relatively inexpensive system that is patient-friendly and readily accessible by medical personnel and patients. Aspects and embodiments of the present invention can be implemented on existing computer systems, such as conventional desktop computer, tablets, or laptop computers to determine the commands from eye movements of a patient. Preferred embodiments function with a variety of backgrounds and lighting conditions behind and surrounding the patient. Preferred embodiments also accommodate a variety of secondary user facial features such as different skin and/or eye color, and maintain operational effectiveness and readiness when parts of face are obscured, for example, by bandages and/or breathing tubes.

SUMMARY OF EMBODIMENTS OF THE INVENTION

Aspects and embodiments of the present invention are directed to a system for obtaining a command from a user. In one embodiment, the system includes a camera configured to capture an image of the user, an image capture module configured to retrieve the image from the camera, an image analysis module configured to determine coordinates of a glint center point from the image and determine coordinates of an eye center point from the image, a gaze direction determiner module configured to determine gaze direction from the coordinates of the glint center point and the coordinates of the eye center point, a typing interface module configured to determine a command corresponding to the gaze direction, and a display configured to present the command to the user. The system may further include a speaker to audibly present the command to the user. The system may also include a tutorial module configured to present a tutorial to the user, and/or a text-to-speech module configured to convert text of the command to speech. In one embodiment of the present invention, the camera may be an infrared camera.

Aspects and embodiments of the present invention are also directed to a computer-implemented method for obtaining a command of a user. The method includes capturing an image of a user, determining coordinates of a glint center point from the image, determining coordinates of an eye center point from the image, determining gaze direction from the coordinates of the glint center point and the coordinates of the eye center point, and determining a command corresponding to the gaze direction.

In one embodiment of the present invention, the step of determining coordinates of the glint center point includes determining whether brightness values of pixels in the image is within a color threshold, and averaging coordinates of pixels within the color threshold. The step of determining coordinates of the glint center point may further include removing regions of pixels in the image wherein the regions are not within a size threshold and/or removing regions of pixels without counterparts from the image.

Embodiments of the present invention determine the coordinates of the eye center point by using a color method that identifies a region of pixels in proximity to the glint center point that determines whether pixels in the region are within a color threshold, and that averages coordinates of the pixels within the color threshold.

Alternatively, the coordinates of the eye center point may be determined using a shape method that identifies edge points from the image, identifies edge points representing a pupil from the shape of edge points, and that identifies the center of edge points representing the pupil. In another embodiment of the present invention, the coordinates of the eye center point may be determined by identifying edge points from the image, identifying edge points representing an iris from the shape of edge points, and identifying the center of edge points representing the iris.

In yet another embodiment of the present invention, the coordinates of the eye center point may be determined by calculating a weighted average of the coordinates obtained from using the color and shape parameters.

Aspects and embodiments of the present invention are also directed to a computer-implemented method of obtaining a command from a user. The method includes selecting a pre-formed phrase from a list of common phrases by detecting a gaze direction of the user directed to an area on a display associated with the pre-formed phrase, determining a custom phrase corresponding to gaze directions of the user directed to a virtual keyboard displayed on the display, and combining the pre-formed phrase and the custom phrase to obtain the command. The method may further include displaying the command to the user and/or outputting the command using a speaker. The area on the display associated with the pre-formed phrase may be an icon.

In one embodiment of the present invention, the virtual keyboard is an ambiguous keyboard that allows words to be entered by a single gaze direction for each letter. When an ambiguous keyboard is used, the system may be configured so that frequently used phrases appear first on the ambiguous keyboard.

BRIEF DESCRIPTION OF THE DRAWINGS

FIGS. 1a-1d illustrate the reflective characteristics of surface of the human eye that can be observed and processed by various embodiments of the present invention.

FIGS. 2a-2c illustrate a human eye looking left and right, and the position of a glint on the eye formed by light reflection.

FIG. 7a is an exemplary flow diagram, illustrating aspects of the image analysis module that determines coordinates of an eye center point using a color method.

DESCRIPTION OF EMBODIMENTS OF THE INVENTION

Figure 3:
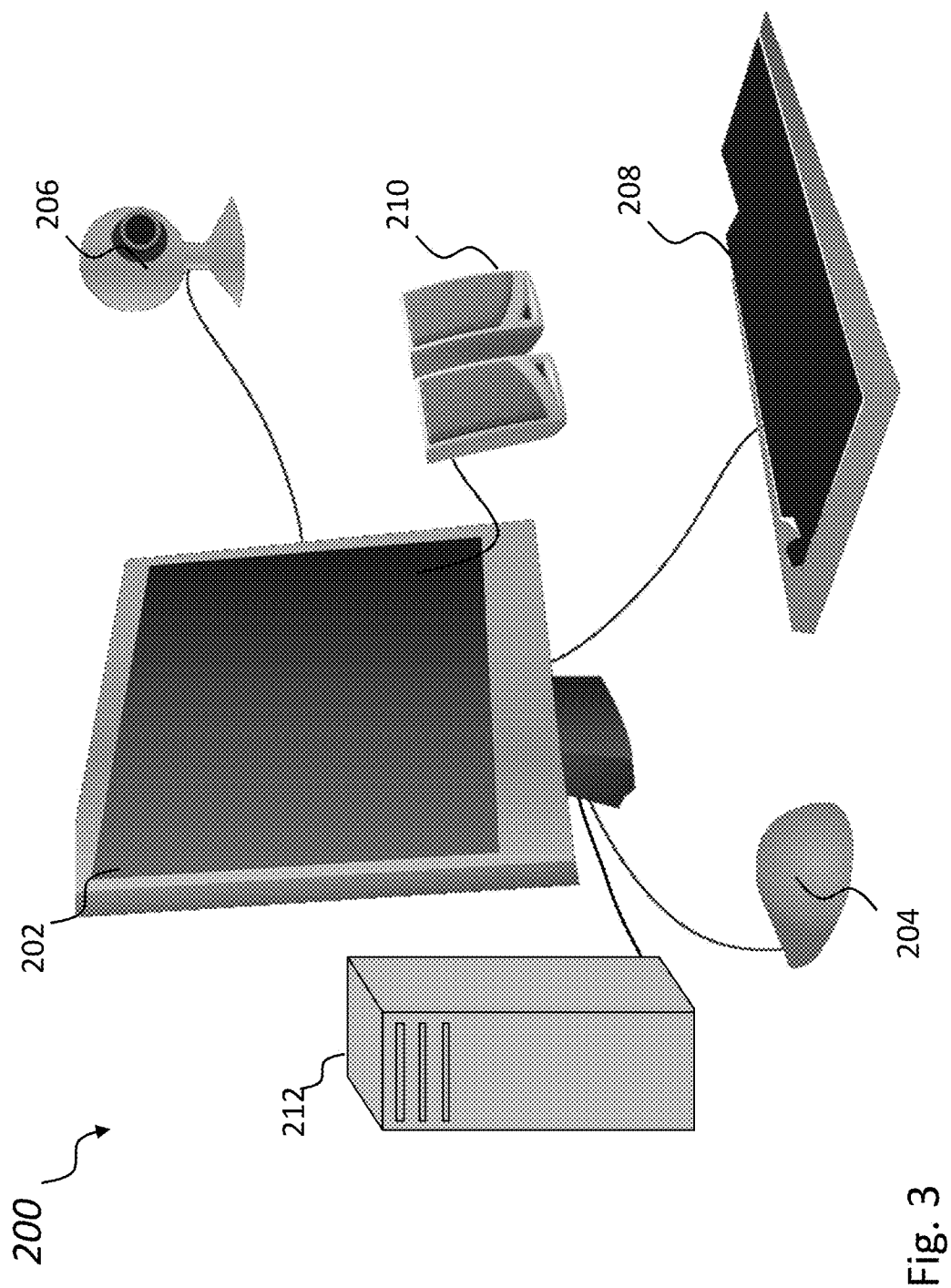
FIG. 3 is an exemplary hardware configuration that can be utilized to implement aspects of the present invention.

FIGS. 1a-1d illustrate characteristics of a human eye 102, which reflects lights that can be processed by various embodiments of the present inventions. One of the visual characteristics which differentiates an eye 102 from the rest of the face is the ability of an eye 102 to reflect light Shining a light on an eye 102 produces a bright spot or glint 112, which is also the center of the curve of the eye. FIG. 1a shows lights 104 from a light source (not shown) positioned directly in front of (and normal with respect to) eye 102 and striking the eye 102. As shown in FIG. 1b, reflected light 106 is scattered by the curved surface of the eye 102. As shown in FIG. 1c, only the light 108 striking the center of the curve of the eye 112 (where the eye surface is normal to the inbound light) is reflected back towards the source. As shown in FIG. 1d, a glint 112, which is a bright spot, is produced at the center of the curve of the eye 112.

FIGS. 2a-2c illustrate a human eye 102 respectively looking straight (viewed from the user's perspective, out of the page), left (viewed from the user's perspective, out of the page), and right (viewed from the user's perspective, out of the page), and the position of a glint 112 on the eye 102 formed by light reflection 108 when the light source is directly in front of (normal with respect to) eye 102. Assuming the user does not move his/her head, the position of the glint 112 (i.e., the center of the curve of the eye) is stationary. The center of the eye 110 is the center of iris 114, or the center of pupil 116. As shown in FIG. 2a, the position of the center of the eye 110 (i.e., the center of iris 114, or the center of pupil 116) equals or is close to the glint 112 when the user is looking straight. As shown in FIG. 2b the center of the eye 110 is positioned to the left of to the glint 112 when the user looks to the left (viewed from the user's perspective, out of the page). As shown in FIG. 2c, the center of the eye 110 is positioned to the right of the glint 112 when the user looks to the right (viewed from the user's perspective, out of the page).

FIG. 3 is an exemplary hardware configuration of a computer system 200 that can be utilized to implement aspects of the present invention. The computer system 200 includes a conventional desktop computer. However, a conventional laptop computer, tablet, cell phone or similar system may be used in lieu of desktop computer 200. The computer system 200 may include a display 202, a keyboard 208, a mouse 204, and a speaker 210. The computer system 200 may also include a camera 206, which may be a webcam. In a preferred embodiment, the camera 206 is an infrared (IR) camera. Use of a conventional non-IR webcam may require constantly shinning a bright light into the user's eyes 110 while operating in a relatively dark room. This discomfort can be avoided by using an IR webcam 206 equipped with IR light-emitting diodes (IR-LEDs). Since IR light is outside of the visual spectrum, the user would be unable to see the light and experience no blinding or discomfort.

Figure 4:
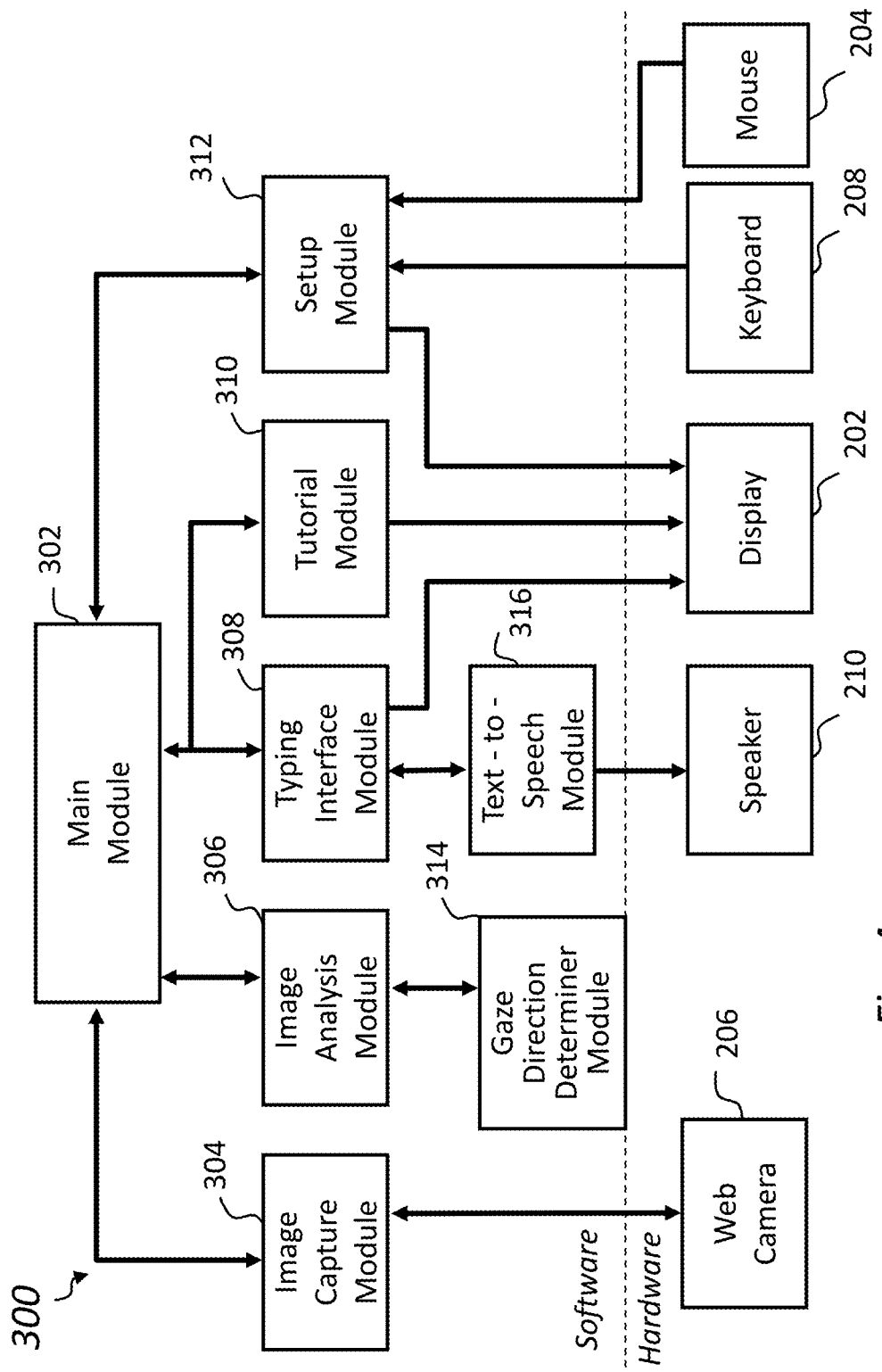
FIG. 4 is an example of a flow diagram of an embodiment of the invention, illustrating exemplary hardware and software modules that can be utilized to implement aspects of the present invention.

FIG. 4 is an example of a flow diagram of an embodiment of the invention, illustrating exemplary hardware and software modules that can be utilized to implement aspects of the present invention. The primary users of the embodiments of the present inventions are the actors who will acquire, install, and run the program, and utilize its output, such as medical personnel including nurses, doctors, and technicians. The secondary users of the embodiments of the present inventions are the actors who will interact with the program and use it to communicate with the primary users, such as patients who are unable to speak or write. The input to the systems and methods of the embodiments of the present invention are images of the secondary user. In a preferred embodiment of the present invention, the secondary user will interact with the system by looking in one of eight directions. However, more than eight directions or less than eight directions can also be utilized. The output of the systems and methods of the embodiments of the present invention are the words or phrases that the secondary user wishes to express.

In one embodiment of the present invention, a main module 302 runs a setup program. In response, the setup module 312 prompts a primary user, through a graphic user interface ("GUI") displayed on a display 202, to calibrate the system 300, select a profile of a secondary user, select whether to run a tutorial, and/or set the volume of a speaker 210, using a keyboard 208 and a mouse 204. If the primary user selects to view a tutorial, a request for a tutorial is sent to the main module 302, which launches a tutorial module 310. The tutorial module 310 then shows the secondary user how to use the system 300.

After the primary user finishes setting up the system 300, the main module 302 sends an image request to an image capture module 304. In response, the image capture module 304 detects a webcam 206. When the image capture module 304 detects a webcam 206, it connects and forwards the image request to webcam 206. In a response, webcam 206 captures real-time images of the user's face. Image capture module 304 retrieves and forwards the real-time images to the main module 302. The main module 302 forwards the images to an image analysis module 306, which analyzes an image of the secondary user's face and records his/her gaze direction as a vector. The image analysis module 306 then sends the gaze direction vector to a gaze direction determiner module 314 which converts the gaze direction vector into a directional command. In a preferred embodiment, the gaze direction determiner module 314 classifies the gaze direction vector as one of eight directional commands, and returns the directional command to the image analysis module 306. The image analysis module 306 forwards the directional command to the main module 302 and then to a typing interface module 308 by the main module 302. The typing interface module 308 determines which letter, word, or phrase the secondary user selected from the directional command, and displays the selected text on a display 202. When the user prompts the system 300 to have the selected text to be read aloud, the typing interface module 308 sends the selected text to a text-to-speech module 316 for conversion into a sound file. After the text is converted in to a sound file, the text-to-speech module 316 sends the sound file to a speaker 210. The modules shown in FIG. 4 are exemplary. More or fewer modules can be used, and the functionality of various modules can be combined.

Figure 5:
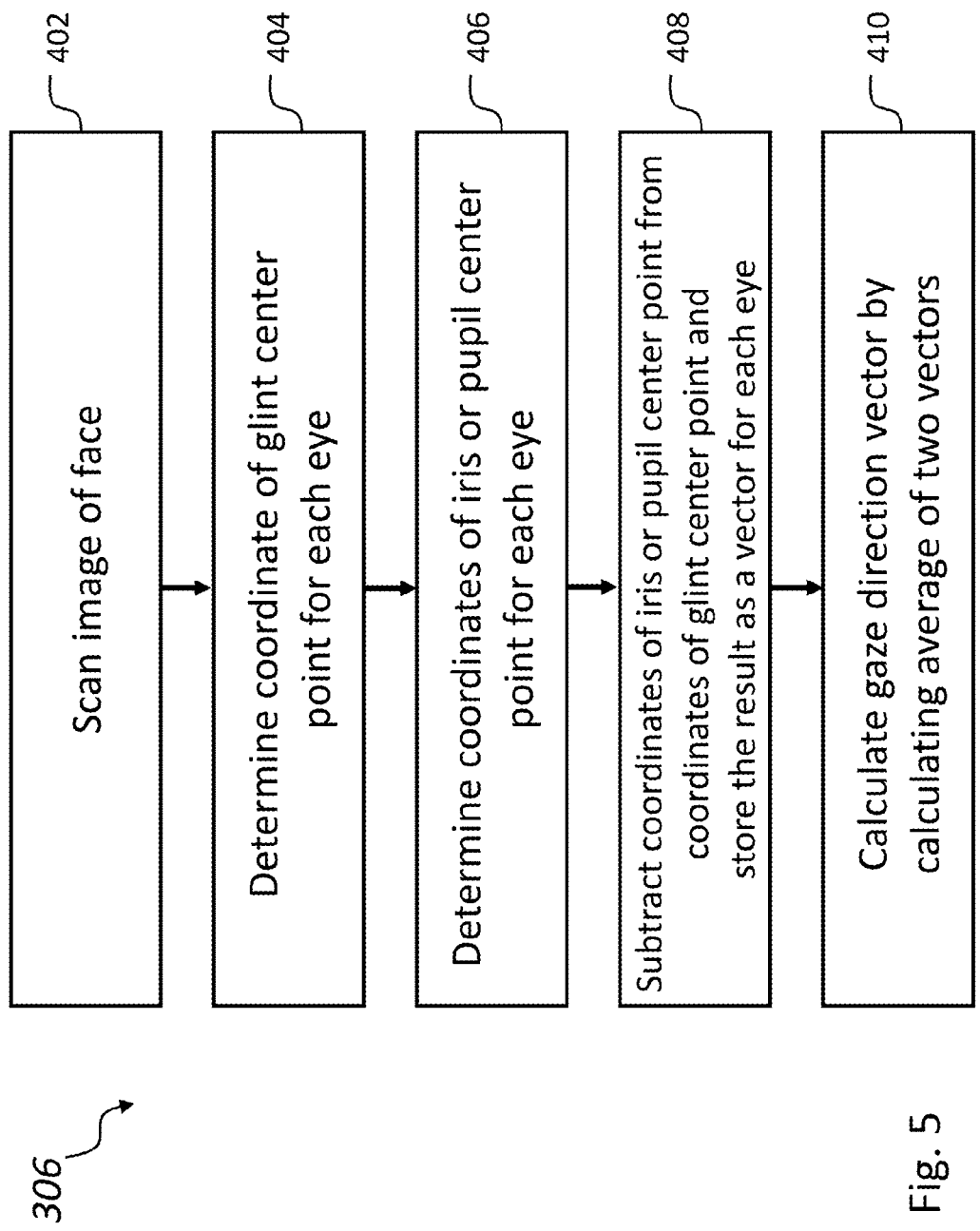
FIG. 5 is an exemplary flow diagram, illustrating aspects of an image analysis module.
Figure 6:
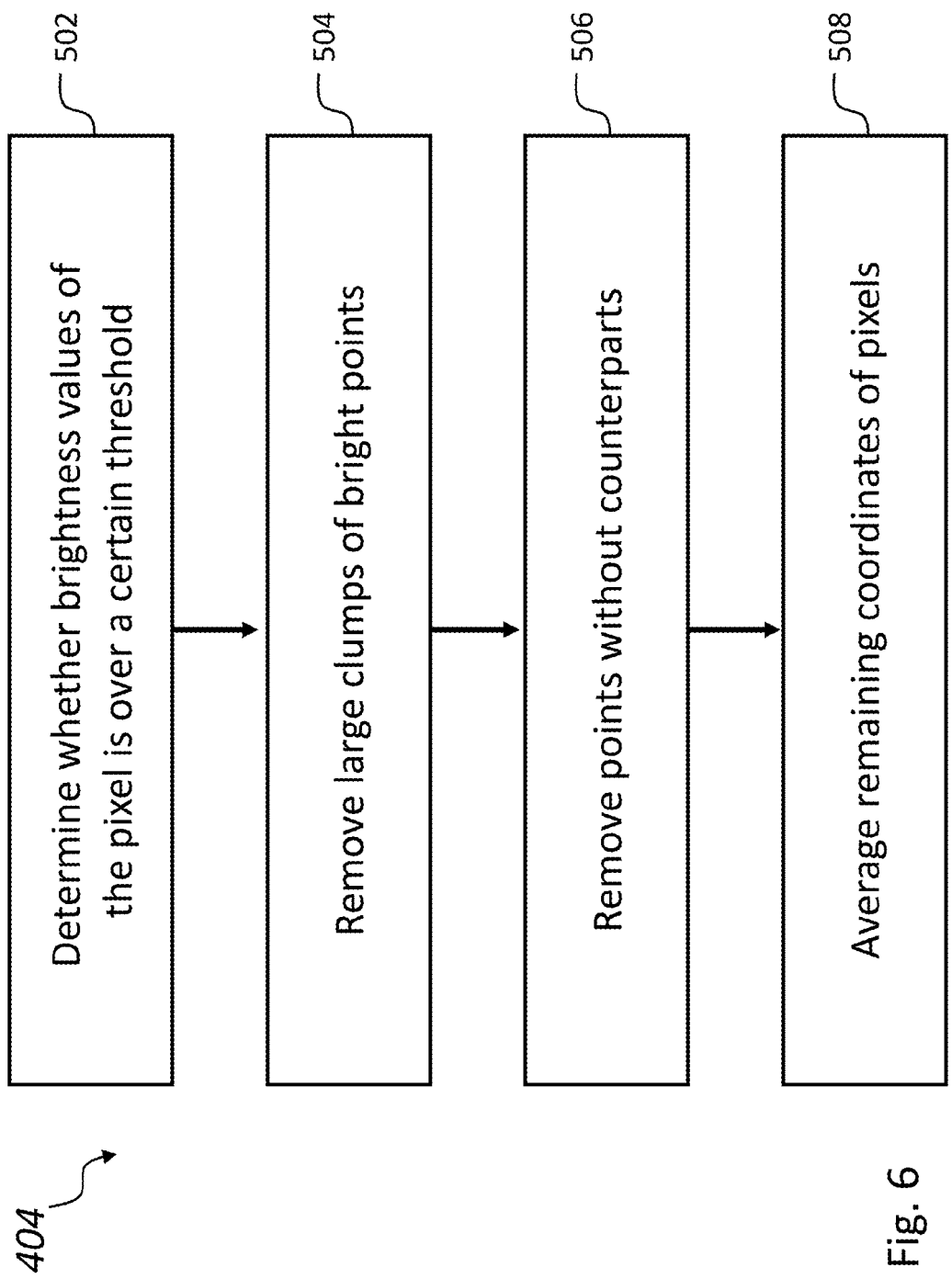
FIG. 6 is an exemplary flow diagram, illustrating aspects of the image analysis module that determines coordinates of a glint center point.

FIG. 5 is an exemplary flow diagram, illustrating aspects of an image analysis module 306. At step 402, an image of a secondary user's face is scanned. At step 404, the image analysis module 306 determines coordinates of the center point of glint 112, for each eye. FIG. 6 further illustrates how the image analysis module 306 determines coordinates of the center point of glint 112 at step 404 in one embodiment of the present invention. At step 406, the image analysis module 306 determines coordinates of the center of the eye 110 for each eye.

Figure 7B:
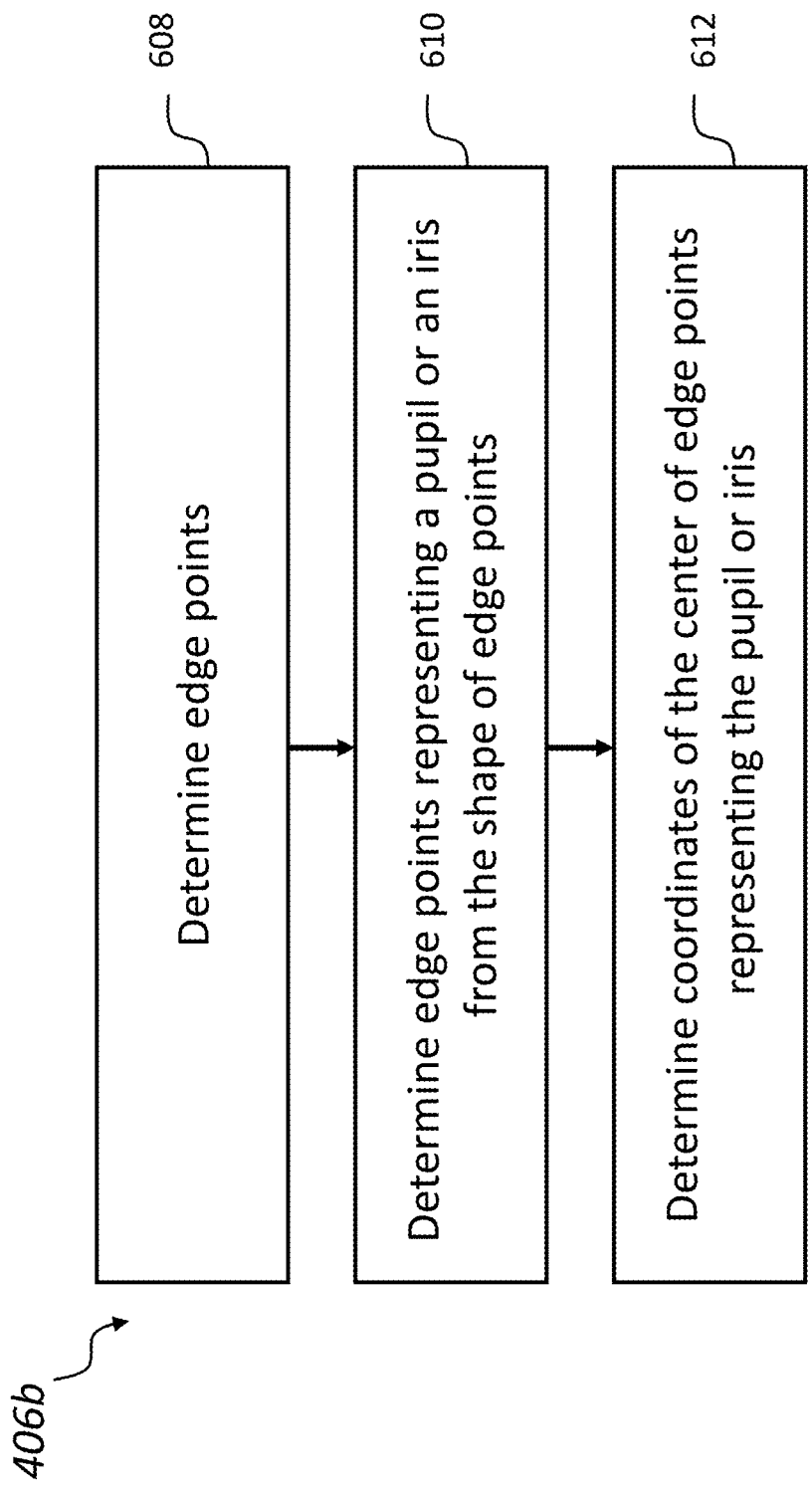
FIG. 7b is an exemplary flow diagram, illustrating an embodiment of the image analysis module that determines coordinates of eye center point using a shape method.
Figure 7C:
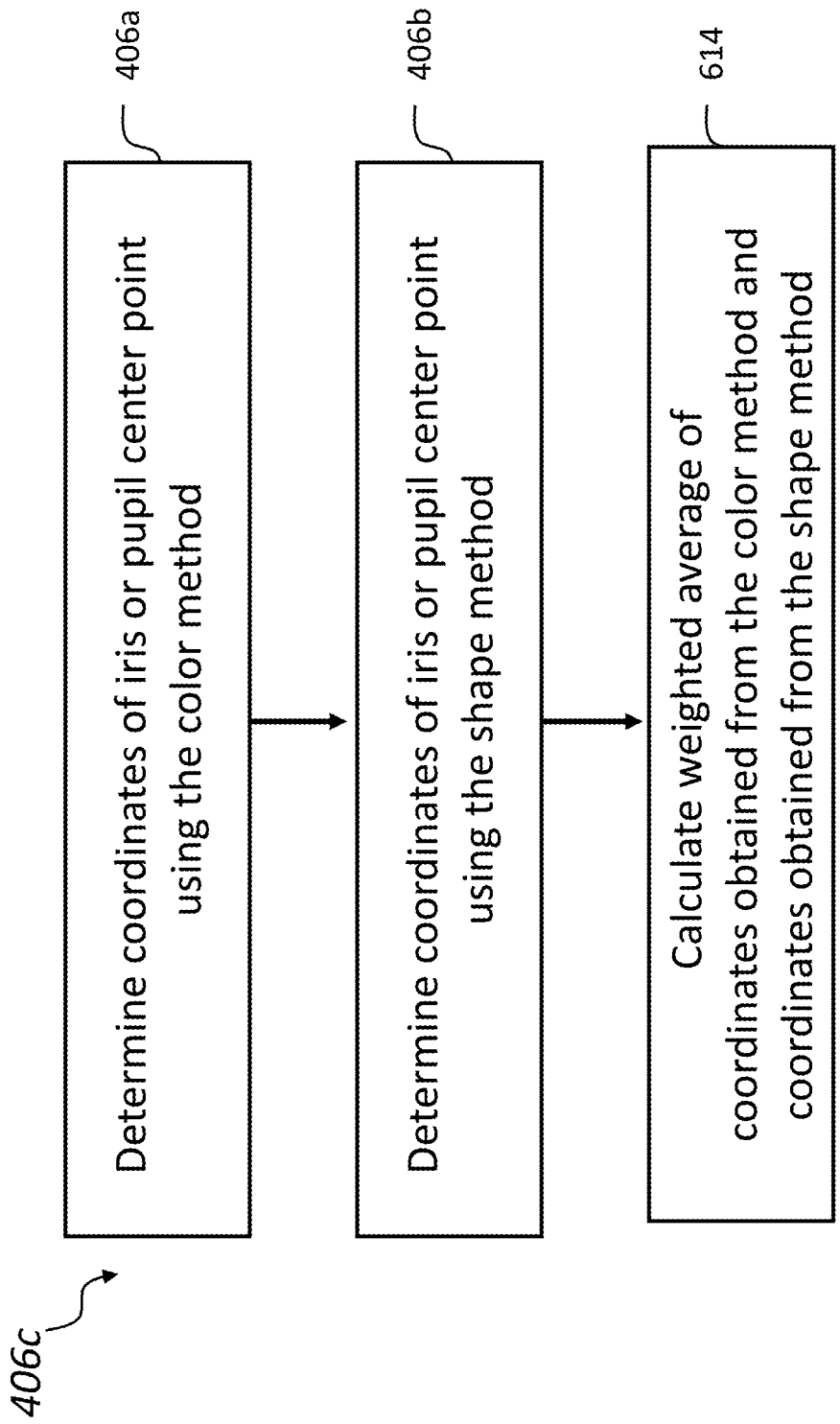
FIG. 7c is an exemplary flow diagram, illustrating an embodiment of the image analysis module that determines coordinates of eye center point using a combined method of the color and the shape method.

In one embodiment of the present invention, the coordinates of the center of the eye 110 are determined using a color method, as illustrated in FIG. 7a. In another embodiment of the present invention, the coordinates of the center of the eye 110 is determined using a shape method, as illustrated in FIG. 7b. In a preferred embodiment, the coordinates of the center of the eye 110 is determined using a combined method, as illustrated in FIG. 7c.

As further shown in FIG. 5, at step 408, the image analysis module 306 subtracts the coordinates of the center of the left eye 110 from the coordinates of the center point of the glint 112 on the left eye 102, and stores the resulting coordinates as a first vector. The image analysis module 306 also subtracts the coordinates of the center of the right eye 110 from the coordinates of the center point of a glint 112 on the right eye 102, and stores the resulting coordinates as a second vector. At step 410, the image analysis module 306 calculates a gaze direction vector to be sent to the gaze direction determiner module 314, by calculating the average of the first and second vectors.

FIG. 6 is an exemplary flow diagram, illustrating aspects of the image analysis module 306 that determines coordinates of the center point of a glint 112 at step 404. To find a glint 112, the image analysis module 306 examines the scanned image for the brightest pixels. In one embodiment of the invention, the image from the camera is grayscaled, and the image analysis module 306 determines whether the brightness value for each pixel is over a certain threshold at step 502. For example, the threshold for the brightness of a glint 112 may be 200 on the grayscale value of 0-255. If the brightness value for the pixel is over the threshold, the pixel is added to a list of bright points.

There are often extraneous bright spots in an image due to reflective objects or lights in the background. In order to prevent extraneous bright spots from interfering with locating the glint 112, the image may be sanitized to remove extraneous bright spots. In one embodiment of the present invention, any large clumps of bright points are removed from the list of bright points at step 504. For example, the glint 112 is typically no larger than 4 pixels when the resolution of the image is 320×240 pixels, and 8 pixels when the resolution of the image is 640×240 pixels. Thus, if there are more than 4 pixels adjacent to each other on the list of bright points, those pixels are removed from the list.

In another embodiment of the present invention, each bright point undergoes a counterpart check. Since a human face is generally symmetrical, the glint 112 has a counterpart glint 112 on the other side of the face of a similar height. Thus, at step 506, any bright points without a counterpart are removed from the list. For example, a bright point with a Cartesian coordinates value of (x1, y1) is removed from the list of bright points for the left side of the face if there is no corresponding counterpart with a Cartesian coordinates value of (x2, y1±allowed error) on the list of bright points for the right side of the face. For example, 10 may be a typical allowed error for an image of 320×240 pixels. In a preferred embodiment of the present invention, both the large clumps of bright points and the bright points without counterparts are removed from the list of bright points.

Finally, at step 508, the remaining points on the list of bright points for the left side of the face are averaged to calculate the coordinates of the center of the glint 112 on the left eye 102. The remaining points on the list of bright points for the right side of the face are also averaged to calculate the coordinates of the center of the glint 112 on the right eye 102.

FIG. 7a is an exemplary flow diagram, illustrating aspects of the image analysis module 306 that determines coordinates of eye center point 110 at step 406 using a color method. To determine the coordinates of the eye center point 110, the image analysis module 306, at step 602, determines a region around the center of the glint 112 on one eye 102. In one embodiment of the present invention, a square (or rectangle) around the center of the glint 112 is defined. In a preferred embodiment of the present invention, an oval around the center of the glint 112 is defined. The size of the region around the center of the glint 112 depends on the resolution of the image and the distance from the camera to the secondary user. For example, an oval with a width of 72 pixels and a height of 48 pixels with the center at the center of the glint 112 may be used when the image resolution is 320×240 pixels and the distance from the camera to the user is 30 cm.

The center of eye 110 may be calculated by calculating the center of iris 114, or the center of pupil 116. At step 604, for every pixel in the region around the glint center point, the image analysis module 306 determines whether the pixel is the correct shade of gray to be part of an iris 114 or a pupil 116. In one embodiment, the image analysis module 306 determines whether the pixel is within a color range, and the coordinates of the pixel is added to the list of iris/pupil points if it is within the color range. For example, the color range may be 70-85 on the grayscale value of 0-255. However, the color range may vary depending on lighting conditions. In one embodiment of the present invention, the color range may be altered during the setup process.

At step 606, the image analysis module 306 calculates the coordinates of the eye center point 110 by averaging the coordinates of all points on the list of iris/pupil points. The steps 602-606 are repeated for the opposite eye 102 to calculate the coordinates of the eye center point 110 for the opposite eye 102.

FIG. 7b is an exemplary flow diagram, illustrating aspects of an alternate embodiment of the image analysis module 306 that determines coordinates of eye center point 110 at step 406 using a shape method. In one embodiment, the points representing the edge of the iris 114 are determined at step 608. Alternatively, the points representing the edge of the pupil 116 are determined at step 608. Although using the points representing edge of a pupil 116 is preferred over using the points representing edge of a iris 114 in terms of accuracy, detection of pupil 116 may not be practicable in low resolution, which costs less. For the purpose of describing the exemplary embodiment, using the points representing the edge of a pupil 116 is described. However, the points representing edge of an iris 114 may be used in a similar fashion to implement alternative embodiments of the present invention.

To determine the points representing the edge of the pupil 116 in step 608, an edge detection algorithm is used to calculate the difference between the intensity of a pixel and the average intensity of its neighboring pixels. Pixels with an intensity variation above a certain threshold are classified as edge points. In one embodiment of the present invention, the image analysis module 306 calculates the average color value of adjacent pixels for each pixel in a region around the glint center point. For example, for each pixel in the region, an average of the color values of the six pixels located to the left side of the pixel and the six pixels located to the right side of the pixel may be calculated. If the average color value of the neighboring pixels is significantly different from the color value of the pixel, the pixel is added to the list of edge points. For example, if the difference between the color value of a pixel and the average color value of the neighboring pixels is greater than 23 on the grayscale value of 0-255, the pixel may be added to the list of edge points. Alternately, a Sobel or Canny filter followed by Hysteresis Thresholding may be used to identify edges. This procedure is a common feature extraction technique used in image analysis, computer vision, and digital image processing to find edge features.

Ideally, the edges of the pupil 116 will create a circle of edge points. At step 610, the edge points representing the pupil 116 are determined from the shape of the edge points. For example, a regression analysis is performed on the edge points for the purpose of fitting the edge points to a circle. There are known algorithms for fitting imperfect instances of objects within a circle. For example, the Hough transform algorithm is a common feature extraction technique used in image analysis, computer vision, and digital image processing to find imperfect instances of objects within a certain class of shapes by a voting procedure. Alternatively, Random Sample Consensus ("RANSAC"), which is an iterative method to estimate parameters of a mathematical model from a set of observed data which contains outliers, or a combination of the Hough transform and RANSAC may be used.

For example, for fitting the edge points representing an iris 114, a circle with a radius of 18 pixels may be used when the image resolution is 320×240 pixels. When the image resolution is 640×480 pixels, or 1280×960 pixels, a circle with a radius of 36 or 72 pixels may be used, respectively. As another example, for fitting the edge points representing a pupil 116, a circle with a radius of 8 pixels may be used when the image resolution is 320×240 pixels. However, detection of pupil 116 may not be practicable in such low image resolution. When the image resolution is 640×480 pixels, or 1280×960 pixels, a circle with a radius of 16 or 32 pixels may be used, respectively. Additionally, the algorithm may search for circles with certain range of radiuses for improved flexibility.

Finally, at step 612, the image analysis module 306 calculates the average coordinates of the points on the list of edge points obtained from the regression analysis performed at step 610.

FIG. 7c is an exemplary flow diagram, illustrating aspects of another embodiment of the image analysis module 306 that determines coordinates of eye center point 110 at step 406, using a combined method of the color and the shape method. At step 406a, the image analysis module 306 calculates the coordinates of the eye center point 110 using the color method, as illustrated in FIG. 7a. At step 406b, the image analysis module 306 calculates the coordinates of the eye center point 110 using the color method, as illustrated in FIG. 7b. At step 614, the image analysis module 306 calculates a weighted average of the coordinates obtained from the color method at step 406a and the coordinates obtained from the shape method at step 406b, such that the average of the coordinates is weighted based on the confidence of the edge points representing the pupil conforming to a circular pattern.

After the image analysis module 306 obtains the coordinates of the eye center point 110 from step 606 in FIG. 7a, step 612 in FIG. 7b, or step 614 in FIG. 7c, the image analysis module 306 subtracts the coordinates of the eye center point 110 from the coordinates of the center point of the glint 112 obtained from step 508 in FIG. 6, and stores the resulting coordinates as vectors at step 408 in FIG. 5. As described above, at step 410, the image analysis module 306 calculates a gaze direction vector by calculating the average of the two vectors, and sends the vector to a gaze direction determiner module 314 for conversion of the gaze direction vector into a directional command. The steps 402-410 may be repeated to increase accuracy. For example, the steps 402-410 may be repeated ten times on ten consecutive images. The ten gaze direction vectors are then averaged to determine the gaze direction vector used to obtain a directional command.

In a preferred embodiment, the gaze direction determiner module 314 classifies the gaze direction vector as one of eight directional commands, and returns the directional command to the image analysis module 306. If the magnitude of the gaze direction vector is below a certain threshold to be classified as a command, the gaze direction determiner module 314 identifies the vector as not being a command. For example, the gaze direction determiner module may be implemented not to trigger a command if the magnitude of the gaze direction vector is smaller than 5 pixels when the image resolution is 320×240 pixels. When the image resolution is 640×480 pixels, or 1280×960 pixels, a threshold for triggering a command may be 10 and 20 pixels, respectively. If the gaze direction determiner module 314 determines that a command is triggered, the directional command is forwarded from the image analysis module 306 to the main module 302, then to a typing interface module 308.

Figure 8:
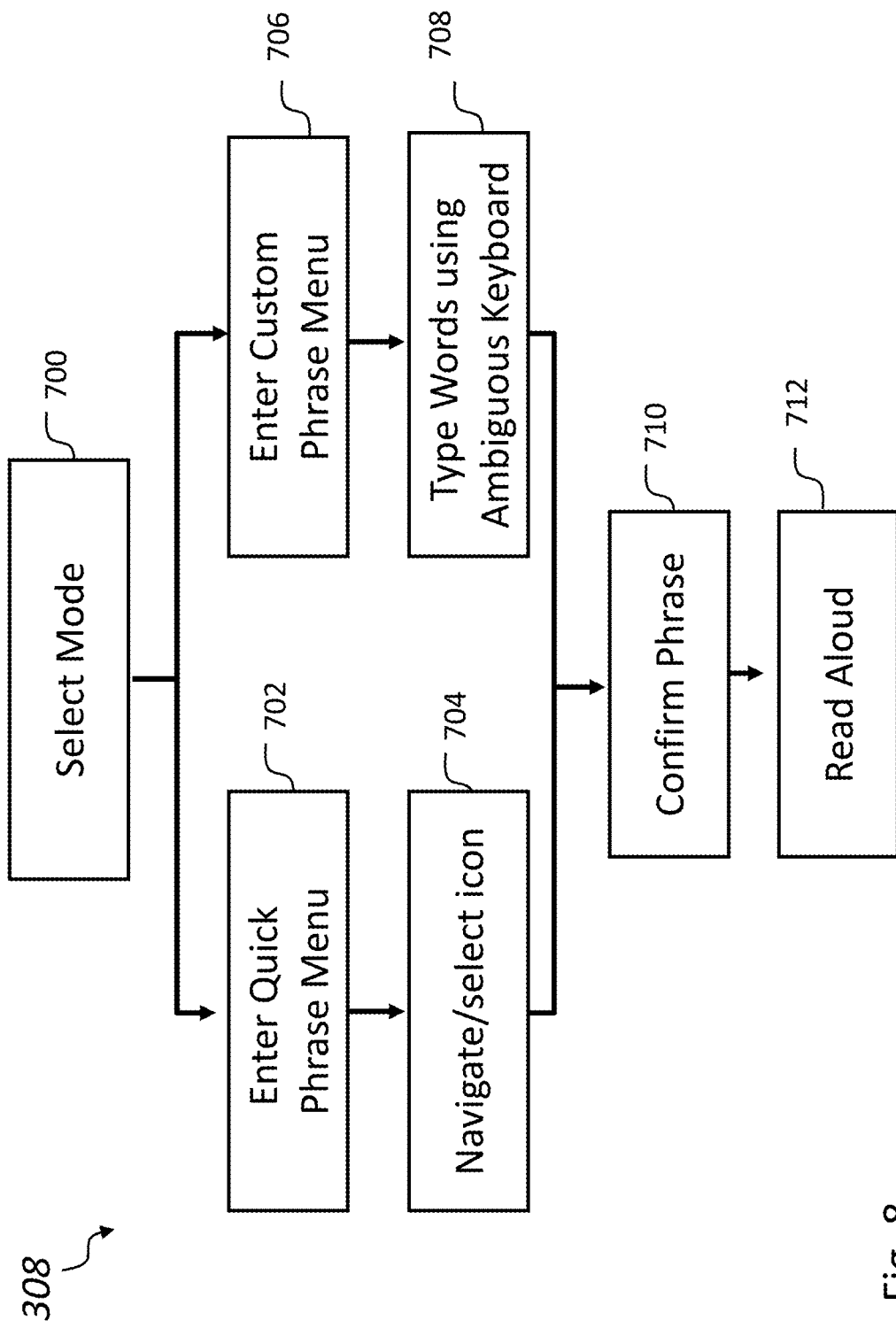
FIG. 8 is an exemplary flow diagram, illustrating aspects of a typing interface allowing a user to input a pre-formed phrase and/or a custom phrase.

FIG. 8 is an exemplary flow diagram, illustrating aspects of a typing interface module 308 allowing a user to input a pre-formed phrase and/or a custom phrase. At step 700, a secondary user is presented with two modes to choose from: Quick Phrase, which allows a user to input a pre-formed phrase, and Custom Phrase, which allows a user to input a custom phrase.

Although a custom phrase gives a user an opportunity to freely express complex words and phrases, typing individual words may be overly complex for some patients. By providing a Quick Phrase mode at step 702, weak patients can communicate with primary users with minimal effort. In addition, pre-formed phrases may be enough in some instances, in which case the user can utilize the Quick Phrase mode as a shortcut to save time to enter a phrase. By providing both the Quick Phrase menu at step 702 and the Custom Phrase menu at step 704, the user can have a choice between expressing simple ideas with a "digital pointing card," or complex ideas with a typing system.

Figure 9B:
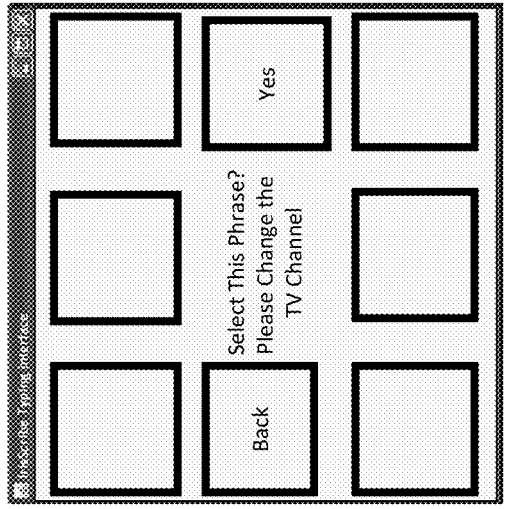
FIGS. 9a-9c are screenshots of a typing interface that allows a user to input a pre-formed phrase.
Figure 9C:
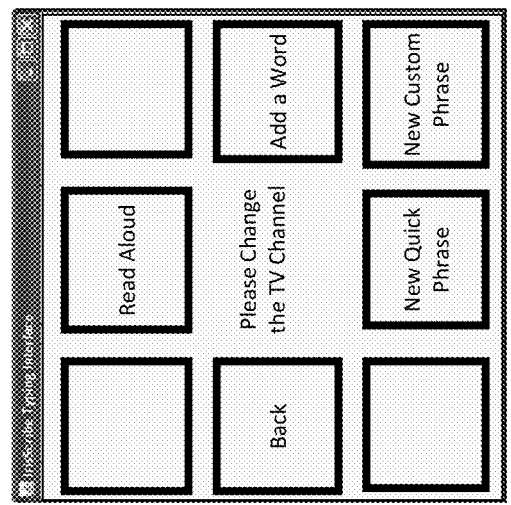
Figure 9A:
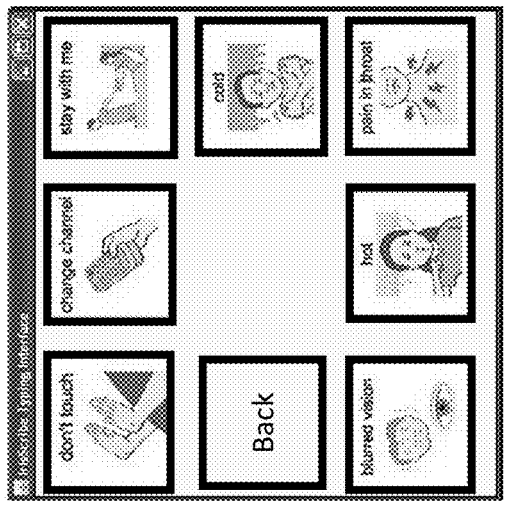

By entering the Quick Phrase mode at step 702, "digital pointing cards," represented by several icons are displayed to the user on the display 202, as shown in FIG. 9*a*. Each icon consists of a common phrase and a representative image. A survey of medical personnel and patients may be conducted to determine the list of pre-formed phrases, representative images, and the order of icons. The user may navigate or select the desired icon at step 704 via directional commands.

Figure 10B:
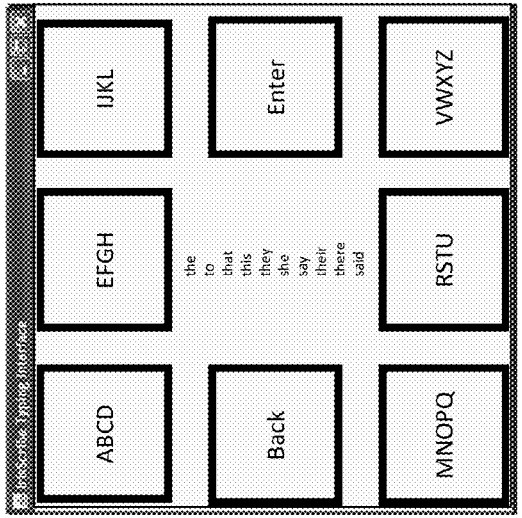
FIGS. 10a-10e are screenshots of a typing interface that allows a user to input a custom phrase, and combine a pre-formed phrase and the custom phrase to obtain a command.
Figure 10C:
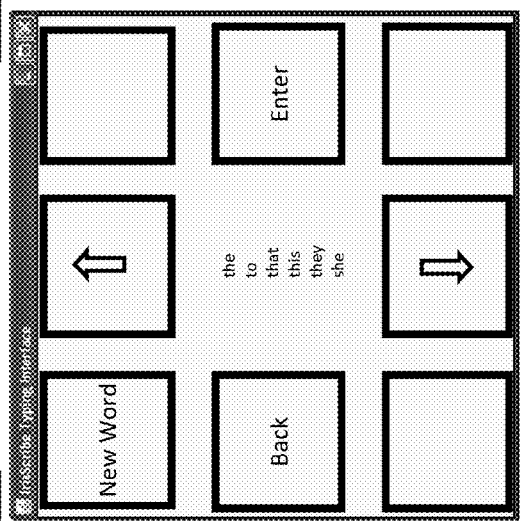
Figure 10A:
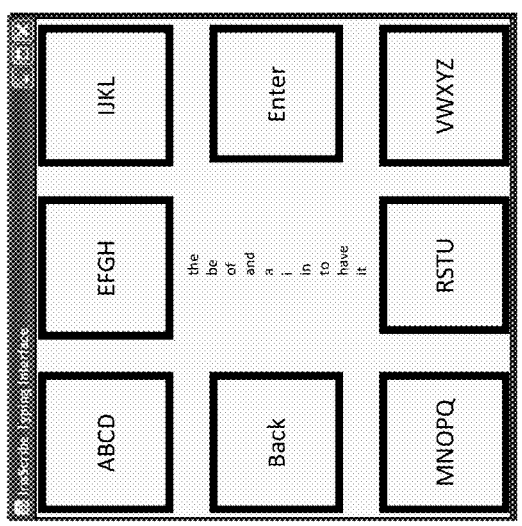

By entering the Custom Phrase mode at step 706, the ambiguous keyboard is displayed to the user on the display 202, as shown in FIG. 10*a*. The user can use an ambiguous keyboard to type out words using the directional commands in step 708.

In a preferred embodiment, the secondary user can access all twenty six letters with only eight commands, as shown in FIG. 10*a*. The letters of the alphabet are divided up amongst the available keys. In an embodiment of the present invention, six of the eight commands will be assigned letters. One of the two non-letter commands corresponds to a backspace key to delete a mistaken letter command.

To type a word, the secondary user can select the commands containing each letter in the desired word. The first selection restricts the first character of a word, and the second selection restricts the second character of the word. As each selection is made, the system trims a list of possible words to include only those which match the letter restrictions given by the user. For example, to type the word "cat," the user can select the [ABCD] command twice, followed by the [RSTU] command. If the user selects "Enter," the typing interface module 308 presents the user with a list of possible word options. A sub-routine will search a list of words in a library and return those that match the commands given by the user. In one embodiment of the present invention, the words in the library may be in the order of most common English words. In a preferred embodiment of the present invention, the library may be personalized according to the profile of the secondary user set by the setup module 302. The words in the personalized library may be in the order of the most common words used by the secondary user with the selected profile, followed by the most common English words.

In a preferred embodiment, the most frequently used words are presented at the top of the list. For example, the top ten words in the list can be displayed to the user. Once the desired word is seen near the top of the list, the user moves to the next menu to scroll through the list and select the desired word. A method in the typing interface module 308 advances a word's position in the list each time it is used, and more frequently selected words appear first in the menu. The user may select the desired word from the list by scrolling through the list and selecting a word. For example, the user may be presented with the ten most common words whose first and second letters are a, b, c, or d and whose third letter is r, s, t or u, such as "cat," "bat," "act," and "car." By selecting "Enter," the user can move to the second menu, in which the user can select a word from the list.

After the secondary user selects a phrase in step 704 or step 708, the user may then advance to confirm the word or phrase at step 710, and have the phrase read aloud at step 712. When prompted, the typing interface module 308 sends the text of the selected word or phrase to a text-to-speech module 316 to be converted into a sound file. After the text is converted in to a sound file, the text-to-speech module 316 sends the sound file to a speaker 210. An existing text-to-speech software such as AT&T's Natural Voice®, NaturalSoft Ltd.'s Natual-Reader©, or Sun Microsystems, Inc.'s FreeTTS may be employed to implement the text-to-speech module 316.

FIGS. 9*a*-9*c* are screenshots of a typing interface, which is presented to the user when the user enters the Quick Phrase menu in step 706, allowing a user to input a pre-formed phrase. In FIG. 9*a*, the user is presented with icons that consist of a common phrase and a representative image. For example, if the user looks up, the "change channel" command is selected and displayed to the user in step 704, as shown in FIG. 9*b*. If the user confirms the command by looking to the right in step 710, the pre-formed phrase "Please change the TV channel" is confirmed.

In FIG. 9*c*, the user may choose the option to have the command read aloud in step 904. The user may also choose to start a new phrase in which case the typing interface module 308 will clear the buffer and repeat the process starting at step 700 in FIG. 8, or add a word to the selected phrase, in which case the typing interface module 308 will store the phrase in the buffer and repeat the process starting at step 700. For example, if the user chooses to add a word in FIG. 10*c* to be taken to step 700 in FIG. 8 and enters the Custom Phrase menu in step 706, the typing interface module will store the selected phrase "Please change the TV channel" in the buffer and present the user with the Custom Phrase menu.

Figure 10E:
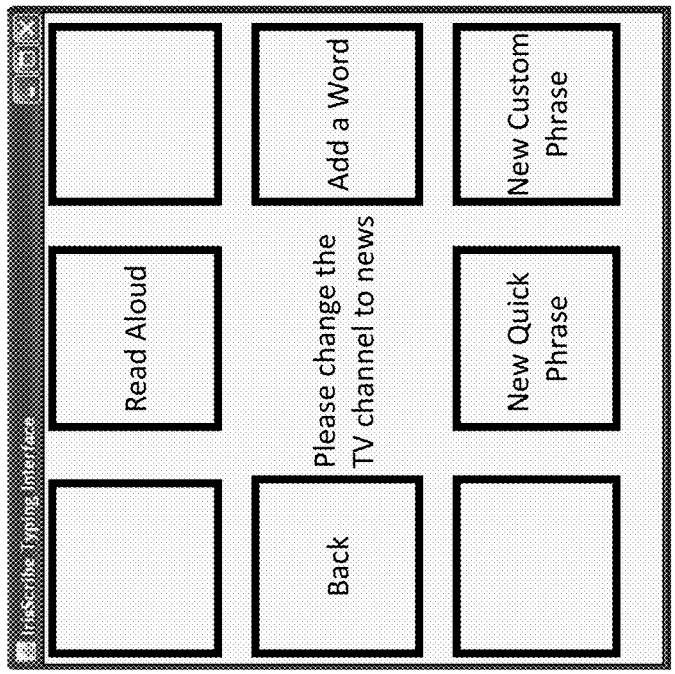
Figure 10D:
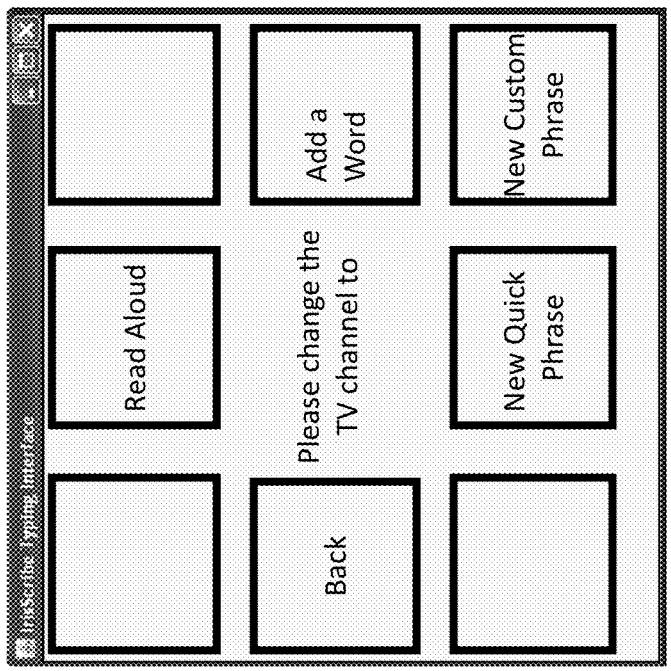

FIGS. 10*a*-10*c* are screenshots of a typing interface, which is presented to the user when the user enters the Custom Phrase menu in step 706 in FIG. 8, allowing a user to input a custom phrase. FIGS. 10*d-e* are screenshots of the typing interface, which is presented to the user when the user chooses to add custom phrases after selecting a preformed phrase.

In FIG. 10*a*, the user is presented with eight commands, corresponding to six letter keys, one "Enter" key, and a backspace key. The top ten most common English words are also listed on the display 202. For example, if the user looks down to select the [RSTU] command, the top ten most frequents words starting with the letter r, s, t, or u are displayed to the user, as shown in FIG. 10*b*. By looking to the right to select "Enter," the user may scroll through the list of the words starting with the letter r, s, t, or u, by looking up and/or down to select the upper/lower arrow button, as shown in FIG. 10c. If the user stops at the word "to," and confirms the command by looking to the right in step 712 in FIG. 8, the custom phrase "to" is confirmed.

In FIG. 10d, the confirmed phrase "Please change the TV channel to" is displayed to the user. The user may choose the option to have the command read aloud, start a new phrase, or add a word to the selected phrase. For example, if the user chooses to add a word to be taken to step 700 in FIG. 8 and enters the Custom Phrase menu to be taken to step 706, the typing interface module 308 will store the selected phrase "Please change the TV channel to" and present the user with the Custom Phrase menu. If the user types and confirms the word "news," the user will be presented with the phrase "Please change the TV channel to news," as shown in FIG. 10e.

The exemplary aspects and embodiment of the present invention above are described based on a system with eight directional commands. However, systems with different number of available directional commands may be appropriate in some circumstances. A system with too many directional commands may be difficult for immobile patients to control with gaze direction and may lead to inaccurate results. A system with too few directional commands, on the other hand, would lead to longer amount of time for a patient to select a word. Therefore, the number of directional commands should be determined based on an appropriate balance between the amount of time to select a word, accuracy, and ease of control.

For example, if there are frequent systematic errors due to inaccuracy, or if a particular secondary user has a difficulty in looking to a certain direction, a system with less number of directional commands may be appropriate. The systematic errors may be lower in identifying directional commands when the user is looking up or down. However, users may habitually rotate their heads to look to the sides, and may have difficulties making sideway eye motions that are distinguishable from diagonal motions. Although some of the difficulties may be partially overcome with training, an alternative approach may be to develop an eye-typing system based a four-command system, for example. A comparative study may then be utilized to determine whether the higher error rate of an eight-command system or the limited menu options of a four-command system is a more significant hindrance.

Figure 11:
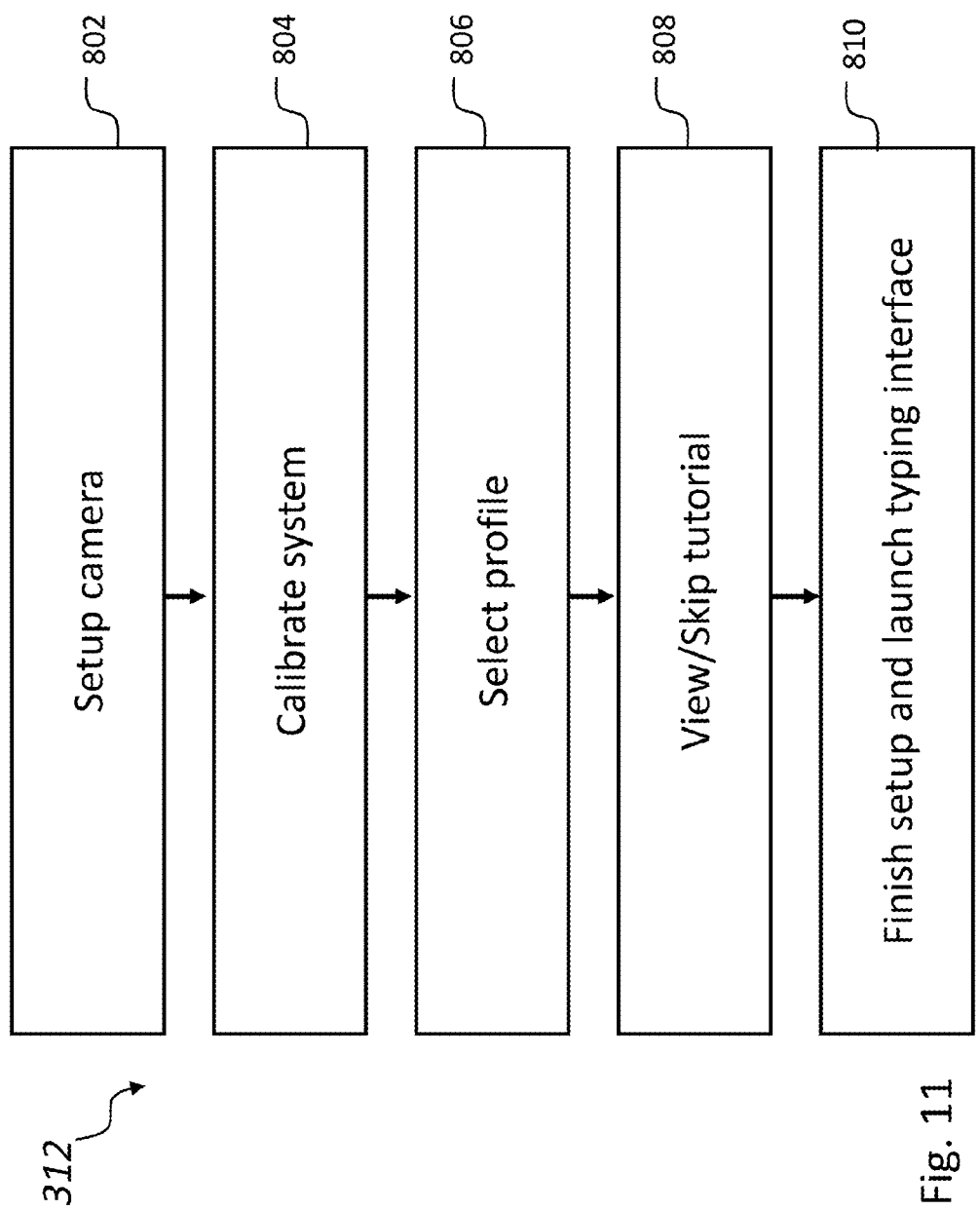
FIG. 11 is an exemplary flow diagram, illustrating aspects of a setup interface.

In one embodiment of the present invention, the main module 302 runs a setup module 312 when a user elects to start using the embodiment of the present invention. FIG. 11 is an exemplary flow diagram, illustrating aspects of a setup interface module 312. In step 802, a message is displayed with instructions for setting up the camera 206.

After the primary user sets up the camera 206 by turning the camera 206 on and the secondary user is positioned in front of the camera, the setup module 312 calibrates the system 300 in step 804. An image of the user's face marked up with the calculated gaze direction vector and directional command is displayed to the user to aid calibration. In a preferred embodiment of the present invention, the system is automatically calibrated by compensating the x and y value of the gaze vector. For example, the gaze direction vector may indicate that the user is looking upward even when the user is instructed to look straightforward. In such case, the y value of the gaze vector is automatically adjusted as if the user is looking straight. The compensation value is stored in a memory, and is used to adjust gaze vectors whenever a gaze vector is used to compute a directional command by the gaze direction determiner module 314. Alternatively, the primary user is presented with vertical and horizontal sliders to manually adjust the gaze vector.

In step 806, the primary user is presented with a menu in which the user can create or select the profile of the secondary user. For example, the primary user may be prompted to select a profile from a list of existing profiles. If the secondary user is a first time user, the primary user may be prompted to input information about the secondary user, such as the name, gender, and/or an identification number.

In step 808, the user is presented with an option to view or skip a tutorial. If the primary user selects to view a tutorial, a request for a tutorial is sent to the main module 302, which launches a tutorial module 310. The tutorial module 310 then shows the user how to use the system. The tutorial may be a text, an audio clip, a video clip, or an interactive program simulating the system.

In step 810, the user is presented with an option to finish setup and launch the GUI for the typing interface. If the user selects to launch the typing interface, the main module 302 launches the typing interface module 308, and presents the user with a menu in which the user can select to enter Quick Phrase mode at step 702, or enter Custom Phrase mode at step 706. The steps shown in FIG. 11 are exemplary. More or fewer steps may be used, and the sequence of the steps may vary.

The structures shown and discussed in embodiments of the invention are exemplary only and the functions performed by these structures may be performed by any number of structures. For example, certain functions may be performed by a single physical unit, or may be allocated across any number of different physical units. All such possible variations are within the scope and spirit of embodiments of the invention and the appended claims.

Embodiments of the present invention have been described for the purpose of illustration. Persons skilled in the art will recognize from this description that the described embodiments are not limiting, and may be practiced with modifications and alterations limited only by the spirit and scope of the appended claims which are intended to cover such modifications and alterations, so as to afford broad protection to the various embodiments of invention and their equivalents.

Having thus described my invention, what I claim as new and desire to secure by Letters Patent is as follows:

1. A system for obtaining a command of a user comprising:
    a camera configured to capture an image of the user;
    an image capture module configured to retrieve the image from the camera;
    an image analysis module configured to i) determine whether brightness values of pixels in the image are within a color threshold, and average coordinates of pixels within the color threshold to determine coordinates of a glint center point from the image, and ii) determine coordinates of an eye center point from the image;
    a gaze direction determiner module configured to determine a gaze direction from the coordinates of the glint center point and the coordinates of the eye center point;
    a typing interface module configured to determine a command corresponding to the gaze direction; and
    a display configured to visually present the command to the user.

2. The system as claimed in claim 1, wherein the camera is an infrared camera.

3. The system as claimed in claim 1, further comprising a speaker configured to audibly present the command to the user.

4. The system as claimed in claim 1, further comprising a tutorial module configured to present a tutorial to the user.

5. The system as claimed in claim 1, further comprising a text-to-speech module configured to convert text of the command to speech.

6. A computer-implemented method for obtaining a command of a user comprising:
 capturing an image of a user;
 determining coordinates of a glint center point from the image;
 determining coordinates of an eye center point from the image, wherein the step of determining coordinates of the eye center point includes:
  a) identifying a first set of edge points having a shape from the image;
  b) identifying a second set of edge points from the shape of the first set of edge points; and
  c) averaging coordinates of the second set of edge points;
 determining a gaze direction from the coordinates of the glint center point and the coordinates of the eye center point; and
 determining a command corresponding to the gaze direction.

7. The method as claimed in claim 6, wherein the second set of edge points represents a pupil.

8. The method as claimed in claim 6, wherein the second set of edge points represents an iris.

9. The method as claimed in claim 6, wherein the step of determining coordinates of the eye center point further comprises:
 d) identifying a region of pixels in proximity to the glint center point;
 e) determining whether pixels in the region is within a color threshold;
 f) averaging coordinates of the pixels within the color threshold; and
 g) calculating a weighted average of the coordinates obtained from steps a)-c) and from the coordinates obtained from steps d)-f), wherein the weighted average of the coordinates is weighted based on a confidence of the second set of edge points conforming to a circular pattern.

10. The method as claimed in claim 9, wherein the second set of edge points represents a pupil.

11. The method as claimed in claim 9, wherein the second set of edge points represents an iris.

12. A computer-implemented method for obtaining a command of a user comprising:
 capturing an image of a user;
 determining coordinates of a glint center point from the image, wherein the step of determining coordinates of the glint center point comprises:
  determining whether brightness values of pixels in the image is within a color threshold; and
  averaging coordinates of pixels within the color threshold;
 determining coordinates of an eye center point from the image;
 determining a gaze direction from the coordinates of the glint center point and the coordinates of the eye center point; and
 determining a command corresponding to the gaze direction.

13. The method as claimed in claim 12, wherein the step of determining coordinates of the glint center point further comprises removing regions of pixels in the image wherein the regions are not within a size threshold.

14. The method as claimed in claim 12, wherein the step of determining coordinates of the glint center point further comprises removing regions of pixels without counterparts from the image.

15. A computer-implemented method for obtaining a command of a user comprising:
 capturing an image of a user;
 determining coordinates of a glint center point from the image;
 determining coordinates of an eye center point from the image, wherein the step of determining coordinates of the eye center point comprises:
  identifying a region of pixels in proximity to the glint center point;
  determining whether pixels in the region is within a color threshold; and
  averaging coordinates of the pixels within the color threshold;
 determining a gaze direction from the coordinates of the glint center point and the coordinates of the eye center point; and
 determining a command corresponding to the gaze direction.

16. A system for obtaining a command of a user comprising:
 a camera configured to capture an image of the user;
 an image capture module configured to retrieve the image from the camera;
 an image analysis module configured to determine coordinates of a glint center point from the image, and further configured to a) identify a region of pixels in proximity to the glint center point; b) determine whether pixels in the region is within a color threshold; and c) average coordinates of the pixels within the color threshold to determine coordinates of an eye center point from the image;
 a gaze direction determiner module configured to determine a gaze direction from the coordinates of the glint center point and the coordinates of the eye center point;
 a typing interface module configured to determine a command corresponding to the gaze direction; and
 a display configured to visually present the command to the user.

17. The system as claimed in claim 16, wherein the camera is an infrared camera.

18. The system as claimed in claim 16, further comprising a speaker configured to audibly present the command to the user.

19. The system as claimed in claim 16, further comprising a tutorial module configured to present a tutorial to the user.

20. The system as claimed in claim 16, further comprising a text-to-speech module configured to convert text of the command to speech.

* * * * *